US012781858B2

(12) United States Patent
Bartonek

(10) Patent No.: US 12,781,858 B2
(45) Date of Patent: Nov. 3, 2026

(54) MOUNTING SYSTEM FOR A SEALING APPARATUS, A SEALING APPARATUS, AND A METHOD FOR MANUFACTURING SUCH A SEALING APPARATUS

(71) Applicant: Illinois Tool Works Inc., Glenview, IL (US)

(72) Inventor: Norbert Bartonek, Hodenhagen (DE)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/895,778

(22) Filed: Sep. 25, 2024

(65) Prior Publication Data

US 2025/0109800 A1 Apr. 3, 2025

(30) Foreign Application Priority Data

Sep. 29, 2023 (DE) ..................... 10 2023 126 686.1
Aug. 14, 2024 (EP) ..................................... 24194600

(51) Int. Cl.
*F16K 5/06* (2006.01)

(52) U.S. Cl.
CPC ................................. *F16K 5/0678* (2013.01)

(58) Field of Classification Search
CPC .... F16K 5/0678; F16K 5/0673; F16K 5/0625; F16K 5/0689; F16J 15/061; F16J 15/3464; B60J 10/30; B25B 27/0028
See application file for complete search history.

(56) References Cited

U.S. PATENT DOCUMENTS 3,584,641 A * 6/1971 Milleville ............... F16K 5/227 251/315.08
3,848,938 A * 11/1974 Stella .................. F16J 15/3232 384/291
4,163,544 A * 8/1979 Fowler ................. F16K 5/0673 251/315.08

(Continued)

FOREIGN PATENT DOCUMENTS

CN 104405877 A * 3/2015
DE 1122789 B * 1/1962

(Continued)

OTHER PUBLICATIONS

Machine Translation of CN 104405877A retrieved from espacenet.com (Year: 2025).*

(Continued)

*Primary Examiner* — Jessica Cahill
(74) *Attorney, Agent, or Firm* — McAndrews, Held & Malloy, Ltd.

(57) ABSTRACT

According to the disclosure, a mounting system for a sealing apparatus of a ball valve apparatus is provided. It comprises a sealing apparatus, wherein the sealing apparatus comprises a housing device made of a hard component and a sealing means made of a soft component, a mounting apparatus having a mounting tappet extending in an axial direction, wherein the mounting tappet comprises a closure body stop face for abutting, in particular axially, against a closure body of a ball valve apparatus and a sealing stop face for abutting, in particular axially, against the sealing apparatus, such that the sealing apparatus can be arranged at a predefined distance from a closure body.

9 Claims, 6 Drawing Sheets

(56) References Cited

U.S. PATENT DOCUMENTS

| | | | | | |
|---|---|---|---|---|---|
| 4,345,738 | A * | 8/1982 | Ripert | F16K 5/0673 | 251/315.08 |
| 4,593,916 | A * | 6/1986 | Laulhe | F16K 5/0673 | 277/637 |
| 4,671,308 | A * | 6/1987 | Williams | F16K 5/0689 | 137/72 |
| 4,673,164 | A * | 6/1987 | Nakanishi | F16K 5/0673 | 251/317 |
| 4,776,601 | A * | 10/1988 | Yamada | F16J 15/061 | 277/601 |
| 4,779,841 | A * | 10/1988 | Pupillo | F16J 15/061 | 251/306 |
| 5,083,801 | A * | 1/1992 | Okano | F16J 15/0831 | 277/598 |
| 5,096,325 | A * | 3/1992 | Udagawa | F02F 11/002 | 403/288 |
| 5,586,770 | A * | 12/1996 | Udagawa | F16J 15/0831 | 277/598 |
| 7,963,455 | B2 | 6/2011 | Heldberg | | |
| 10,487,878 | B2 * | 11/2019 | Voisine | F16C 23/043 | |
| 11,525,519 | B2 | 12/2022 | Gramss | | |
| 2010/0327539 | A1 * | 12/2010 | Okaji | F16C 33/7843 | 277/572 |
| 2015/0075452 | A1 | 3/2015 | Oikawa | | |
| 2021/0222778 | A1 * | 7/2021 | Gramss | F16K 5/0678 | |

FOREIGN PATENT DOCUMENTS

| | | | | |
|---|---|---|---|---|
| DE | 29502247 | U1 * | 5/1995 | |
| DE | 102018117240 | A1 | 1/2020 | |
| DE | 102021115125 | A1 | 12/2022 | |
| DE | 102022114004 | A1 | 12/2022 | |
| DE | 102022114129 | A1 | 12/2022 | |
| EP | 2052177 | B1 | 6/2011 | |
| EP | 4102115 | A1 | 12/2022 | |
| GB | 191414403 | A * | 4/1915 | B25B 27/0028 |

OTHER PUBLICATIONS

Examination report dated Mar. 8, 2024 in German application No. 10 2023 126 686.1, (6 pages).

* cited by examiner

MOUNTING SYSTEM FOR A SEALING APPARATUS, A SEALING APPARATUS, AND A METHOD FOR MANUFACTURING SUCH A SEALING APPARATUS

RELATED APPLICATIONS

The present application claims the benefit of German Patent Application No. DE 10 2023 126 686.1, filed Sep. 29, 2023, and European Patent Application No. 24194600.3, filed Aug. 14, 2024, each titled "2K Sealing Package with Radial Housing Seal," the contents of which are hereby incorporated by reference.

BACKGROUND

Coolant valves are used in cooling circuits of motor vehicles, such as cars or trucks. They are used, for example, in order to cool an internal combustion engine. Depending on the position of the valve element, for example, cooling liquid is passed by a radiator via a bypass line during a warmup phase of the internal combustion engine and, after reaching the operating temperature, passed through the radiator. In the case of coolant valves, depending on the application, it is also possible for coolant to flow only temporarily through the coolant valve, for example when the coolant flow is completely prevented during the cold start phase of a combustion engine. Control of the valve element can be self-actuated, for example via elements made of expanding materials. However, electric drives for adjusting the valve element are also possible, which are controlled by a control device.

For example, to seal the coolant ports against the valve element, annular sealing assemblies are provided, which, on the one hand, abut sealingly against the housing, in particular the housing section that delimits the coolant port, and on the other hand sealingly against the valve element.

For example, a coolant valve having such a sealing assembly is known from U.S. Pat. No. 7,963,455. The thermostat valve described therein has a spherical valve element, wherein the sealing assembly comprises a slip ring made of slidable, solid plastic that is biased against the valve element by an elastomeric sealing ring. The slip ring can be made of, for example, PPS (polyphenylene sulfide) or PTFE (polytetrafluoroethylene), and the elastomeric sealing ring can be made of, for example, EPDM (ethylene-propylene-diene rubber). With the known thermostat valve, a reliable seal can be achieved at any time. However, significant costs are associated with the known sealing assembly.

A coolant valve for a motor vehicle is disclosed in U.S. Pat. No. 11,525,519. It comprises a housing having a plurality of coolant ports and a valve element arranged in the housing for connecting or separating coolant ports, as well as at least one sealing assembly arranged in the region of at least one coolant port, which on the one hand sealingly abuts the housing and on the other hand sealingly abuts the valve element. The coolant valve is wherein the sealing assembly comprises a carrier element made of a first material and a sealing element made of a second material, wherein the second material is softer than the first material, the sealing element comprises a first sealing lip abutting the valve element, and the carrier element comprises a support section, wherein the first sealing lip protrudes over the support section with a free end, and wherein the first sealing lip is compressed onto the support section upon a flow of coolant through the coolant valve.

One problem with known sealing assemblies of coolant valves is that there is a conflict of goals between a reliable attachment of the sealing assembly to the valve element and thus a secure sealing even at low system pressure, on the one hand, and a high resiliency and low avoidance at high pressure in case of low friction torques and thus low drive torques for the valve element, on the other hand.

Closure elements or bodies for valves, in particular for ball valves, are typically subject to a certain amount of mounting and/or manufacturing tolerance. This can lead to problems in the sealing of ports of the ball valve, because, on the one hand, a corresponding seal is intended to sealingly abut the closure element of the ball valve, and on the other hand a contact pressure of such a seal may not be so high to unnecessarily increase the forces for actuating the closure body.

SUMMARY

The present disclosure relates generally to a mounting system for a sealing apparatus, a sealing apparatus, and a method for manufacturing such a sealing apparatus, substantially as illustrated by and described in connection with at least one of the figures, as set forth more completely in the claims.

BRIEF DESCRIPTION OF THE DRAWINGS

The foregoing and other objects, features, and advantages of the devices, systems, and methods described herein will be apparent from the following description of particular examples thereof, as illustrated in the accompanying figures, where like or similar reference numbers refer to like or similar structures. The figures are not necessarily to scale, emphasis instead being placed upon illustrating the principles of the devices, systems, and methods described herein.

DETAILED DESCRIPTION

Figure 1:
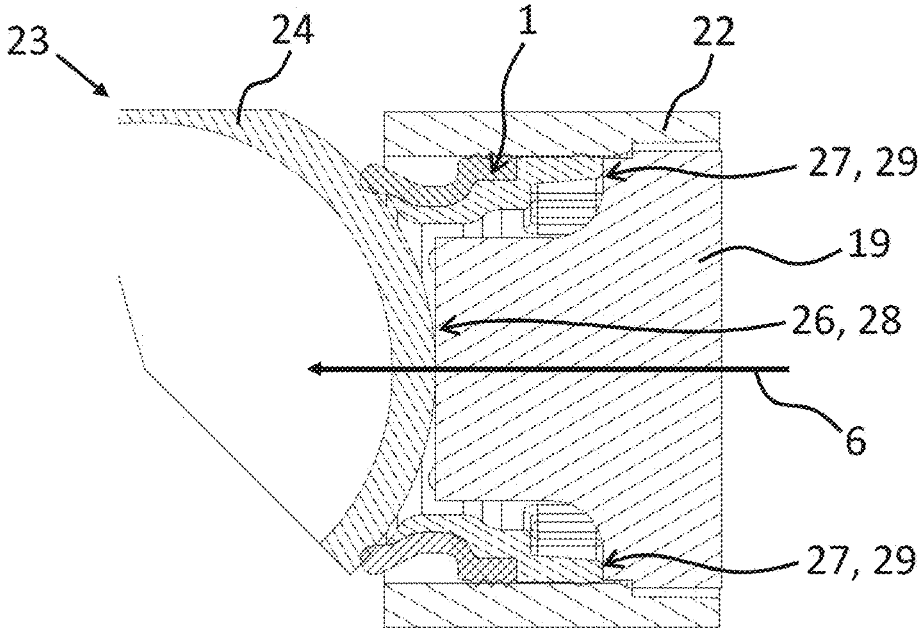
FIG. 1 illustrates a schematic side-cut view of a mounting tappet according to the disclosure and a sealing apparatus according to the disclosure, each according to a first exemplary aspect in a final mounting position.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as “first,” “second,” “top,” “bottom,” “side,” “front,” “back,” and the like are words of convenience and are not to be construed as limiting terms. For example, while in some examples a first side is located adjacent or near a second side, the terms “first side” and “second side” do not imply any specific order in which the sides are ordered.

The terms “about,” “approximately,” “substantially,” or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language (“e.g.,” “such as,” or the like) provided herein, is intended merely to better illuminate the disclosed examples and does not pose a limitation on the scope of the disclosure. The terms “e.g.,” and “for example” set off lists of one or more non-limiting examples, instances, or illustrations. No language in the specification should be construed as indicating any unclaimed element as essential to the practice of the disclosed examples.

The term “and/or” means any one or more of the items in the list joined by “and/or.” As an example, “x and/or y” means any element of the three-element set {(x), (y), (x, y)}. In other words, “x and/or y” means “one or both of x and y”. As another example, “x, y, and/or z” means any element of the seven-element set {(x), (y), (z), (x, y), (x, z), (y, z), (x, y, z)}. In other words, “x, y, and/or z” means “one or more of x, y, and z.”

The present disclosure relates to a mounting system for a sealing apparatus, a sealing apparatus, and a method for manufacturing such a sealing apparatus.

The problem addressed by the present disclosure is to provide a mounting system for a sealing apparatus for a ball valve apparatus, a sealing apparatus, and a corresponding method for mounting that allows a tolerance compensation between a closure body seal and a closure body.

A further problem addressed by the present disclosure is to provide a mounting system for a sealing apparatus for a ball valve apparatus, a sealing apparatus, and a corresponding method for mounting that allows a simple mounting and yet also a sealing abutment of a closure body seal on a closure body of a ball valve apparatus.

In addition, a problem addressed by the present disclosure is to develop a mounting system for a sealing apparatus, a sealing apparatus, and a corresponding method for mounting that are safe and reliable in operation and offer an alternative to the prior art.

According to the disclosure, a mounting system for a sealing apparatus of a ball valve apparatus is provided. It comprises a sealing apparatus, wherein the sealing apparatus comprises a housing device made of a hard component and a sealing means made of a soft component, a mounting apparatus having a mounting tappet extending in an axial direction, wherein the mounting tappet comprises a closure body stop face for abutting against a closure body of a ball valve apparatus and a sealing stop face for abutting against the sealing apparatus, such that the sealing apparatus can be arranged at a predefined distance from a closure body.

The principle underlying the mounting system according to the disclosure as well as the sealing apparatus according to the disclosure is that the closure body sealing element of the sealing apparatus is pushed from the outside onto a closure body or onto a ball of a ball valve apparatus in order to mount it without the sealing apparatus itself comprising valve-side means for precise positioning and being free of means for axial fixed positioning. In particular, the mounting system according to the disclosure is provided with a mounting apparatus according to the disclosure, having a mounting tappet.

The mounting tappet is wherein it comprises a closure body stop face, which, when abutting against a closure body of a ball valve apparatus, allows for easily reproducible and always consistent positioning of the sealing apparatus against a closure body of a ball valve apparatus.

The mounting tappet can comprise a closure body stop face for axially abutting against a closure body of a ball valve apparatus and a sealing stop face for axially abutting against the sealing apparatus, such that the sealing apparatus can be arranged at a predefined distance from a closure body.

In this case, the mounting tappet is wherein it comprises a closure body stop face, which, when abutting in the axial direction against a closure body of a ball valve apparatus, allows for easily reproducible and always consistent positioning of the sealing apparatus against a closure body of a ball valve apparatus. In this way, the sealing apparatus is always present with a same contact pressure on a closure body of a ball valve apparatus or with an always uniform assembly dimension relative to a closure body of a ball valve apparatus, in particular in the axial direction.

Thus, with the system according to the disclosure, a tolerance compensation between a closure body of a ball valve apparatus and the sealing apparatus is possible, in particular in the axial direction, in order to achieve a reproducible mounting position of the sealing apparatus with respect to a closure body. Furthermore, the mounting tappet can comprise a sealing stop face for axial abutment on the housing device of the sealing apparatus, which is formed in particular from a hard component.

By providing two stop faces, wherein a first stop face is formed on the sealing apparatus to be mounted, in particular in the region of the main component of the housing device of the sealing apparatus, and by the closure body stop face, which are arranged to be axially offset from one another, a consistent positioning of the sealing apparatus with respect to a closure body of a ball valve apparatus is possible.

The present disclosure is suitable not only for rotationally symmetrical closure bodies of ball valve apparatuses, but also for eccentrically supported closure bodies of ball valve apparatuses and can ensure an always uniform assembly dimension securely and reliably.

This ensures securely and reliably that the closure body sealing element always abuts with a uniform contact pressure on the closure body of the ball valve apparatus, or that the closure body sealing element always has an exactly defined, uniform assembly dimension with respect to a closure body and not with respect to a housing.

The sealing stop face can extend orthogonally to the axial direction and can be formed as a tangentially circumferential circular-annular surface arranged on an edge region of the mounting tappet.

Due to the fact that the sealing stop face is tangentially circumferential and circularly annular in form, it is securely and reliably ensured that a corresponding hard component of the housing device of the sealing apparatus can be subjected to a uniform force in the axial direction and that no tilting torque would occur that would lead to an askew or inclined assembly position of a corresponding sealing apparatus in relation to the axial direction.

The closure body surface can also extend orthogonally to the axial direction and be configured as a circular disk-shaped surface that can be centrally arranged on the mounting tappet.

The circular disk-shaped surface of the closure body stop face is preferably configured to extend orthogonally to the axial direction. However, in certain circumstances, a concave or a convex or, in a top view, rectangular or square configuration of the closure body stop face can also be advantageous here.

Due to the fact that the closure body surface extends orthogonally to the axial direction and contacts a largely convex or spherical surface of a closure body only in a very small region, an exact positioning of the sealing apparatus is possible. A corresponding section on a closure body is hereinafter referred to as the second stop face.

The closure body surface can form a free end of the mounting tappet in the axial direction, wherein the sealing surface can be rearwardly offset from the closure body stop face in the axial direction.

In particular, the closure body stop face and the sealing stop face must be configured such that the housing device of the sealing apparatus is first contacted by means of the mounting tappet, which is then slidable in the axial direction and subsequently, in an final mounting position, the closure body stop face contacts the second stop section of the closure body.

Furthermore, the mounting tappet can comprise a receiving section for receiving the sealing apparatus.

Such a receiving section is in particular cylindrical in shape, such that the sealing apparatus can be arranged thereon.

This results in the advantage that the sealing apparatus does not have to first be manually arranged in a housing of a ball valve apparatus and in a second step is arranged in its end position by means of the mounting tappet, but rather that in a single mounting step, a corresponding sealing apparatus can be mounted in a housing of a ball valve apparatus.

The radial sealing element can be circular-annular in form and can comprise at least one or two or three successively arranged sealing lips, which extend radially outward and circumferentially in the axial direction.

Furthermore, a sealing apparatus according to the disclosure is provided, which comprises the housing device made of a hard component and a sealing apparatus made of a soft component. The sealing apparatus can in particular be circular-annular in form. Furthermore, the sealing apparatus can comprise: a closure body sealing element arranged on a valve side of the sealing apparatus for sealingly abutting against a closure body of a ball valve apparatus and an axial or radial sealing element extending in the radial and/or axial direction for sealing against a housing of a ball valve apparatus.

The radial sealing element can be circular-annular in shape and can comprise at least one or two or three sealing lips that are successively arranged in the axial direction, extending in the radial direction outwardly and configured to be radially and tangentially circumferential.

The advantages of the radial sealing element will be described in further detail below on the basis of two exemplary aspects of a sealing apparatus according to the disclosure, which apply analogously to the radial sealing element. Furthermore, the housing device can comprise a catching device for connecting with a housing of a ball valve apparatus.

Corresponding catching elements and also tolerance compensation sections as described below on the basis of a third and a fourth exemplary aspect can also be provided in the same way for the first and second exemplary aspects. The technical features of the exemplary aspects of the present disclosure can thus be combined as desired with one another. The catching elements and/or tolerance compensation sections are contours that can also ensure the position of the sealing apparatus when the mounting system is removed from a valve. By means of the catching elements, the sealing element can be fixed in position by means of "clamping" or "creeping" of the softer housing material.

In addition, the sealing apparatus can be configured such that only the radial sealing element or only the axial sealing element or both sealing elements are provided for sealing against a housing of a ball valve apparatus. The catching device can comprise flexible catching arms having catching elements molded thereon and extending radially outwardly.

The features of the sealing apparatus according to the disclosure can be combined with the further exemplary aspects of the sealing apparatus according to the disclosure, which are described below, insofar as technically possible and sensible.

Furthermore, according to the present disclosure, there is provided a method for mounting a sealing apparatus with a mounting system for a sealing apparatus of a ball valve apparatus, as described above. This method comprises the following steps: arranging a sealing apparatus in a housing of a ball valve apparatus, arranging a mounting tappet of a mounting apparatus on a housing side of the sealing means, contacting a sealing stop face at an approximately correspondingly formed first stop face of the sealing means by exerting a force acting in the axial direction on the mounting tappet, exerting a force acting in the axial direction on the mounting tappet until a closure body stop face abuts against a surface of a closure body of the ball valve apparatus, wherein this section of the closure body is referred to as the second stop face, and wherein, at this moment, the mounting tappet is no longer subjected to force acting in the axial direction, and wherein a final mounting position of the sealing means is achieved.

The advantages of the method according to the disclosure correspond analogously to the advantages described above on the basis of the mounting system according to the disclosure. In particular, it can be provided that the sealing apparatus is first placed on a receiving section of the mounting tappet before being introduced into a housing of a ball valve apparatus.

According to the disclosure, a sealing apparatus for a ball valve apparatus is provided. It comprises a housing device made of a hard component and a sealing means made of a soft component. The sealing means comprises a closure body sealing element arranged on a valve side of the sealing means for sealingly abutting against a closure body of a ball valve apparatus, and a radial sealing element extending radially outwards for radially sealing against an in particular tubular port of a housing of a ball valve apparatus.

By means of the radial sealing element, a secure and reliable sealing of a closure body of a ball valve apparatus against a tubular connection of a housing of a ball valve apparatus is ensured.

By providing the radial sealing element extending radially outwards for radially sealing against a housing device of a ball valve apparatus, the sealing apparatus can be positioned relatively freely in the axial direction or in and/or counter to a flow direction or arranged variably in the housing device, as long as a sealing abutment against a closure body is ensured.

That is to say, the sealing apparatus can be variably positioned or arranged in the axial direction in order to thus compensate for tolerances between the closure body sealing element and a closure body of a ball valve apparatus. The sealing apparatus according to the disclosure thus allows for a relatively free arrangement of the closure body sealing element in the axial direction.

Due to the construction of the sealing apparatus according to the disclosure, the axial movement of the sealing apparatus does not influence the sealing function compared to a port of a housing of a ball valve apparatus.

The sealing apparatus, and in particular the closure body sealing element, are thus arrangeable in various axial positions in a housing of a ball valve apparatus.

The principle underlying the mounting system according to the disclosure is that the closure body sealing element of the sealing apparatus is pushed from the outside onto a closure body or onto a ball of a ball valve apparatus in order to mount it without the sealing apparatus itself comprising valve-side means for precise positioning and being free of means for axial fixed positioning.

For this purpose, the mounting apparatus according to the disclosure can be equipped with a mounting tappet. Such a mounting tappet comprises a receiving section for receiving the sealing apparatus, as well as at least one axial first stop section for axially positioning the sealing apparatus.

Such a mounting apparatus thus provides the exact assembly position of the sealing apparatus in a housing device of a ball valve apparatus. The mounting tappet is configured to comprise the first stop section for abutting against a closure body or ball of a ball valve apparatus. In this way, it is ensured that the assembly position of the sealing apparatus according to the disclosure does not depend on fixed parameters, such as a housing of a ball valve apparatus, but rather on the exact mounting position of a closure body of a ball valve apparatus.

This ensures securely and reliably that the closure body sealing element always abuts with a uniform contact pressure on the closure body of the ball valve apparatus, or that the closure body sealing element always has an exactly defined, uniform assembly dimension with respect to a closure body and not with respect to a housing.

An optional tolerance compensation element made from the soft component for balancing tolerances between the closure body sealing element and a closure body of a ball valve apparatus can be arranged on a housing side of the sealing apparatus opposite the valve side, wherein the tolerance compensation element extends at least in sections in the axial direction and forms a distal end region of the housing side of the sealing apparatus.

The tolerance compensation element prevents the sealing apparatus according to the disclosure from deflecting in the axial direction away from the closure body of a ball valve apparatus upon being mounted.

In this way, an axial length tolerance compensation of a clearance of a closure body of a ball valve apparatus, and in particular a compensation of tolerances between the closure body sealing element and a closure body of a ball valve apparatus, is possible.

The tolerance compensation element supports or increases the technical effect and/or the technical principle of operation of the sealing apparatus according to the disclosure as discussed above.

The mounting tappet of the mounting apparatus can comprise a second stop section for abutting against the tolerance compensation element of the sealing apparatus.

The radial sealing element can be circular-annular in form and can comprise at least one or two or three or more successively arranged sealing lips, which extend radially outward and circumferentially in the axial direction.

Due to the fact that the radial sealing element comprises a plurality of radially circumferential sealing lips, a secure and reliable sealing of the sealing apparatus against a housing of a ball valve apparatus, and thus also a closure body of a ball valve apparatus against a housing device, is possible.

The housing device can comprise a catching device for connecting with a housing of a ball valve apparatus.

By means of the catching device, the sealing apparatus can be easily connected to a port of a housing of a ball valve apparatus.

Furthermore, the catching device is configured to enable a fixing of the sealing apparatus in a port of a housing of a ball valve apparatus without the need for a catching device receptacle configured to correspond to the catching device.

In the following, technical features of a third exemplary aspect of a sealing apparatus according to the disclosure are shown. However, these technical features are not limited to the third exemplary aspect, but rather can be combined with the technical features of the other exemplary aspects of the sealing apparatus according to the disclosure.

In this case, it can be provided that only the radial sealing element is provided for sealing against a housing of a ball valve apparatus.

In this way, an arrangement or positioning of the sealing apparatus according to the disclosure that is free in the axial direction is enabled, because no additional mounting parameters in the axial direction must be met in order to realize a sealing abutment of a seal acting in the axial direction for sealing against a housing of a ball valve apparatus.

The catching device can comprise flexible catching arms having catching elements molded thereon and extending radially outwardly.

The sealing apparatus according to the disclosure can be fixed in a housing of a ball valve apparatus via the catching elements. Preferably, a corresponding housing of a ball valve apparatus does not comprise any catching recesses configured to correspond to the catching elements, so that the catching elements are configured to fix the sealing apparatus on a smooth surface or on a smooth inner sheath wall of a port of a housing of a ball valve apparatus.

The tolerance compensation element can comprise a plurality of tolerance compensation sections, which are surrounded in regions by crenelation elements of the housing device. In this way, a plurality of tolerance compensation sections are provided radially circumferentially spaced apart from one another on the side of the housing for uniform abutment, in particular on a mounting tappet of a mounting apparatus.

These tolerance compensation sections allow for uniform exposure of the sealing apparatus to a mounting force acting in the axial direction and, in particular, allow for exact positioning of the sealing apparatus by abutting against the second stop section of the mounting tappet of the mounting apparatus, so that the closure body sealing element sealingly abuts against a closure body of a ball valve apparatus. The sealing apparatus can thus be arranged at a predefined distance from a closure body of a ball valve apparatus.

In the crenelation elements of the housing device, preferably corresponding plunge channels can be configured for the tolerance compensation sections of the tolerance compensation element made from the soft component.

Furthermore, the crenelation elements with the tolerance compensation sections can be arranged to alternate with the catching arms as well as radially circumferential and equally spaced apart from one another on the housing side of the sealing apparatus.

In the sealing apparatus according to the disclosure according to the first exemplary aspect, it can in particular be provided that the sealing apparatus is only configured for a flow from the valve side towards the housing side.

Technical features of the fourth exemplary aspect of the sealing apparatus according to the disclosure will now be described in further detail in the following. These can also be combined as desired with the technical features of the first three exemplary aspects of the sealing apparatus according to the disclosure.

The tolerance compensation element can be circular-annular in shape and radially circumferential.

According to this exemplary aspect, the tolerance compensation element is also arranged on a housing side of the sealing apparatus.

The sealing apparatus according to the second exemplary aspect can in particular be configured such that only a flow within the sealing apparatus from the housing side towards the valve side is provided.

For this purpose, the tolerance compensation element can take on a further function and, at the same time, an axial sealing element can be configured for sealing abutment against a housing of a ball valve apparatus.

According to the second exemplary aspect, an additional sealing of the sealing apparatus against a housing of a ball valve apparatus in the axial direction can thus be provided, in order to increase the sealing effect of the sealing apparatus. Furthermore, the catching device can be configured as a radially circumferential flange element, wherein catching elements that extend radially outwardly, in particular radially circumferential and equally spaced from one another, are molded onto the flange element.

The technical effect of the catching elements analogously corresponds to the technical effect of the catching elements discussed above. Furthermore, the flange element can form a stop for abutting against a housing of a ball valve apparatus.

Thus, the sealing apparatus according to the disclosure has the same technical features as the sealing apparatus according to the first exemplary aspect, with respect to the free or variable arrangement in a housing of a ball valve apparatus, however, additionally, as shown above, an axial sealing element and a flange element forming a stop are provided, wherein the possibility of free axial positioning is slightly restricted by these technical features.

In the following, further technical features of the sealing apparatus according to the disclosure are shown, which can be provided in both the sealing apparatus according to the first exemplary aspect as well as the sealing apparatus according to the second exemplary aspect.

The housing device can be formed in the manner of an undercut in the region of the sealing apparatus, in particular in the region of the radial sealing element, wherein the radial sealing element in this region comprises correspondingly configured sections in order to securely and reliably connect the sealing apparatus or the soft component to the housing device or the hard component, respectively.

The catching elements can be configured as half-spheres.

The hard component can preferably be made from polypropylene styrene (PPS) or polyphthalamide (PPA), and the soft component can preferably be made from an elastomer.

Furthermore, according to the present disclosure, a method for manufacturing a sealing apparatus as described above is provided, wherein the sealing apparatus is manufactured by means of a 2-component injection-molding process.

The third and the fourth exemplary aspects can also be configured without a tolerance compensation element. This is therefore provided merely optionally. All technical features of the present disclosure can be combined with one another as desired, insofar as technically possible and sensible.

Figure 2:
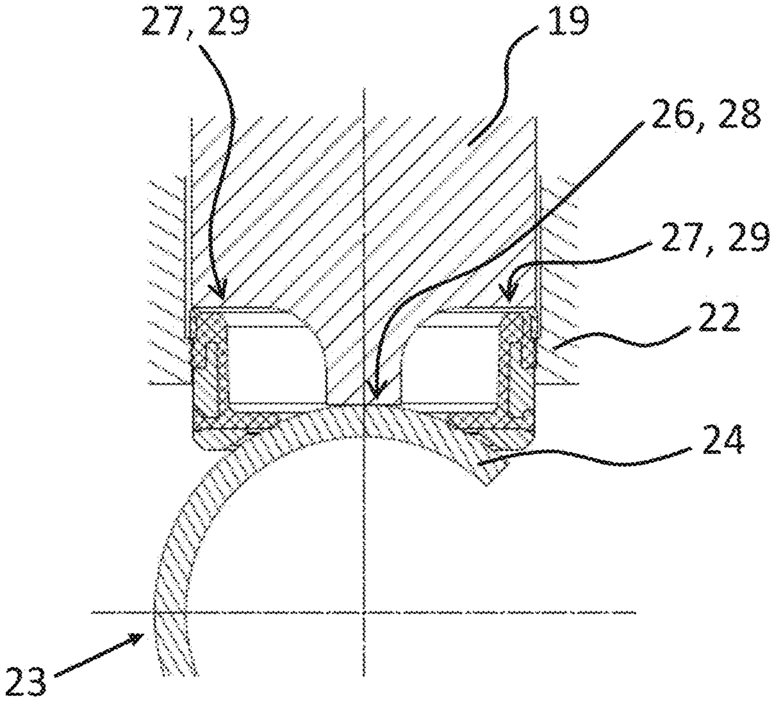
FIG. 2 illustrates a schematic side-cut view of a sealing apparatus according to the disclosure and a mounting tappet according to the disclosure, each according to a second exemplary aspect.
Figure 3:
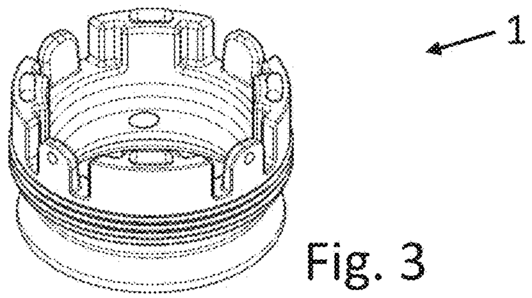
FIG. 3 illustrates a perspective view of a sealing apparatus according to the disclosure according to a third exemplary aspect.
Figure 4:
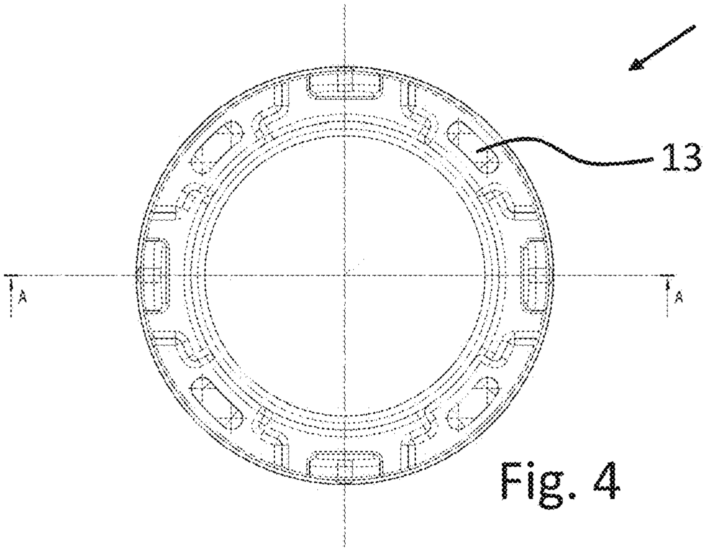
FIG. 4 illustrates a top plan view of a housing side of the sealing apparatus from FIG. 1.
Figure 5:
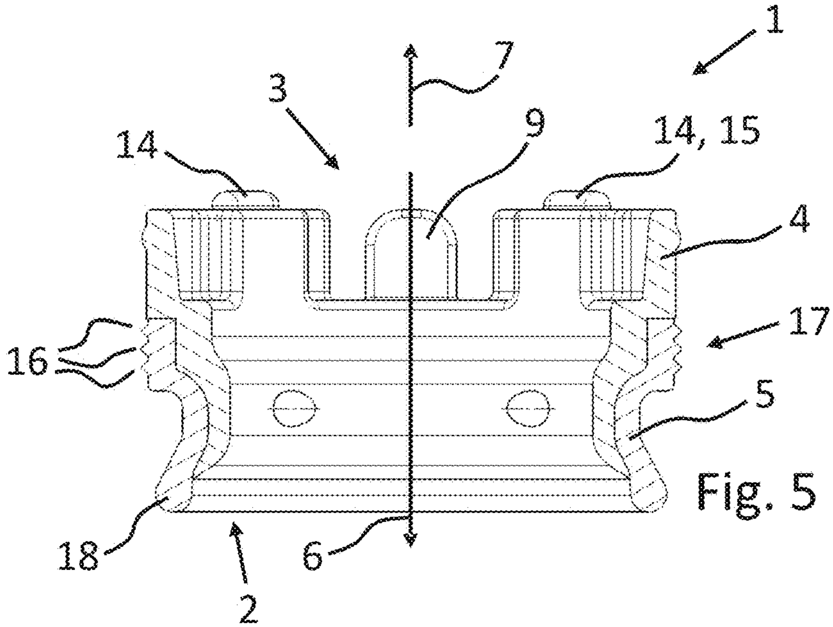
FIG. 5 illustrates the sealing apparatus from FIG. 4, cut along the line A-A.
Figure 6:
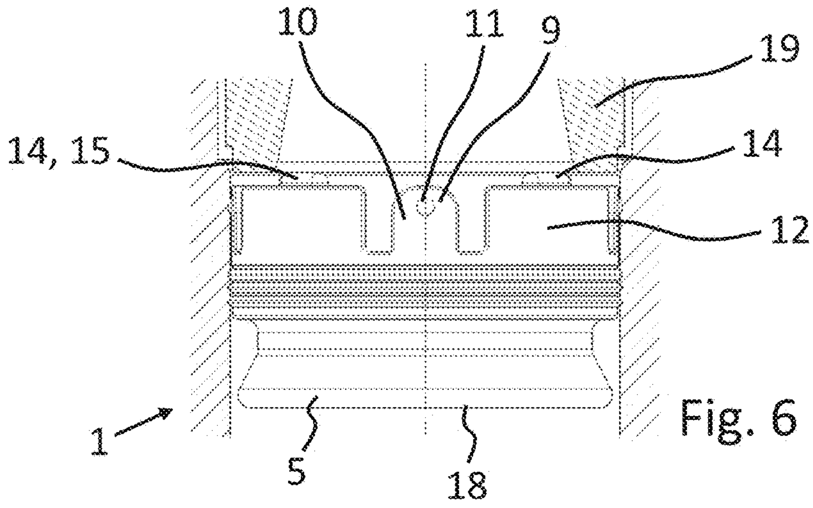
FIG. 6 illustrates a schematic side view of the sealing apparatus in a state when installed in a housing of a ball valve apparatus, with a section of a corresponding mounting apparatus.
Figure 7:
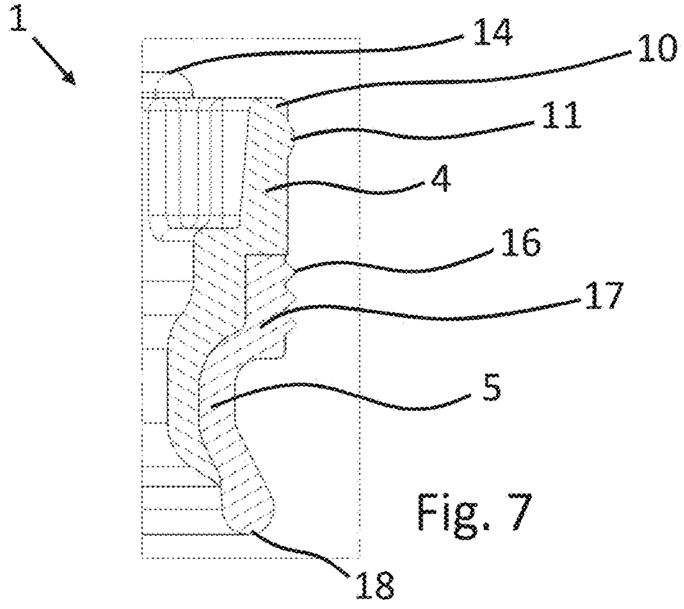
FIG. 7 illustrates a perspective side-cut detailed view from FIG. 5.
Figure 8:
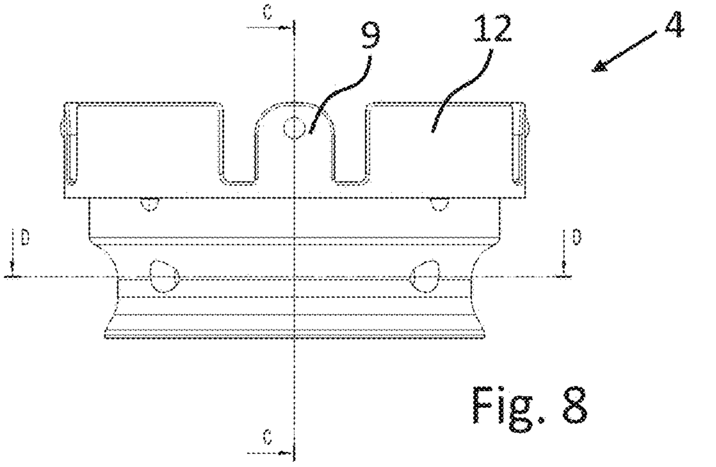
FIG. 8 illustrates a side view of a housing device of the sealing apparatus.
Figure 9:
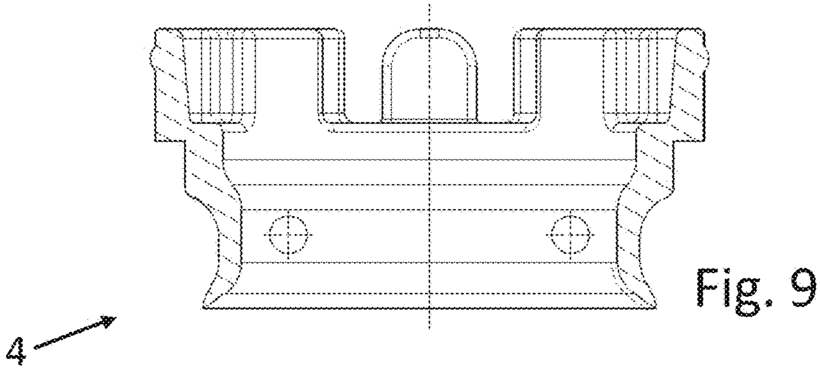
FIG. 9 illustrates a side-cut view of the housing device from FIG. 8, cut along the line C-C.
Figure 10:
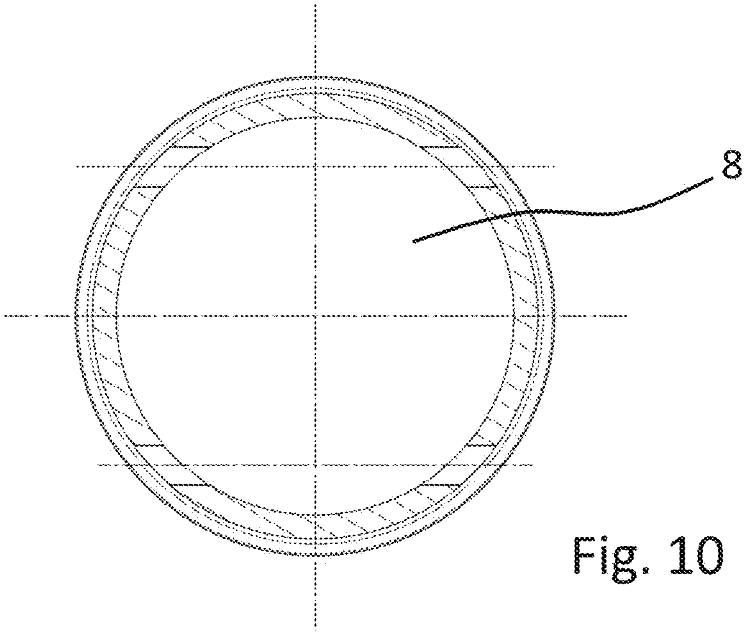
FIG. 10 illustrates a cross-sectional view of the housing device from FIG. 8, cut along line D-D.
Figure 11:
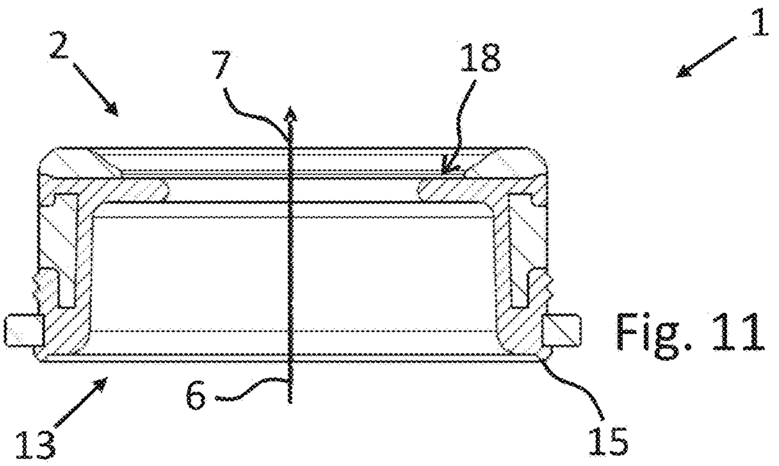
FIG. 11 illustrates a side-cut view of a sealing apparatus according to the disclosure according to a sixth exemplary aspect.
Figure 12:
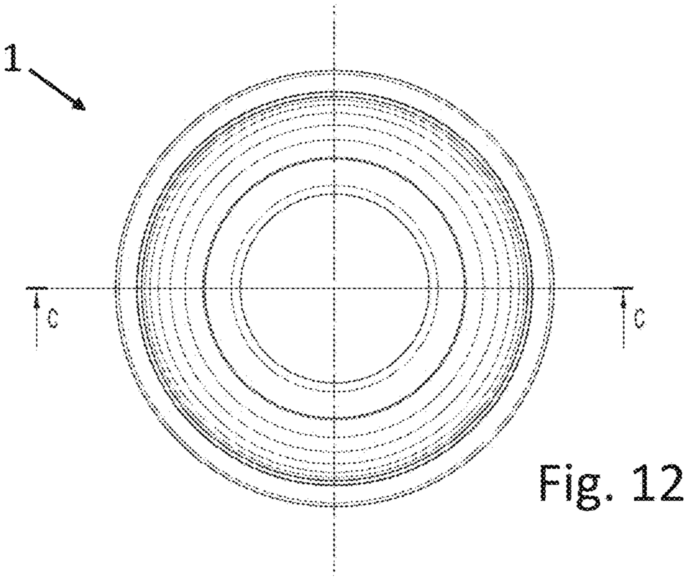
FIG. 12 illustrates a top plan view from a housing side onto the sealing apparatus from FIG. 11.
Figure 13:
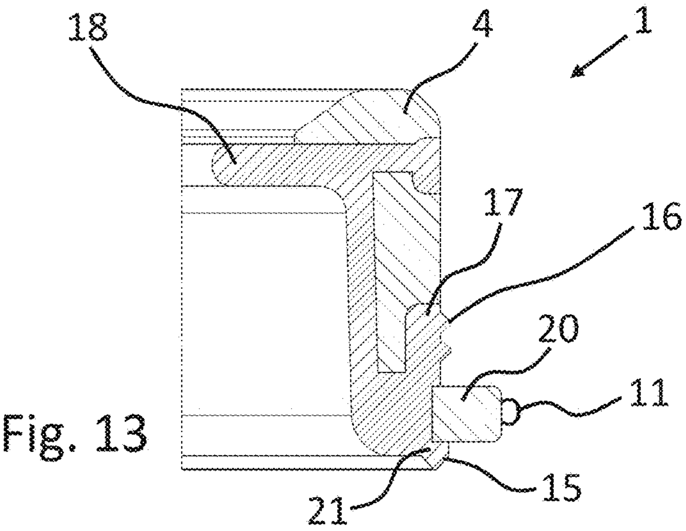
FIG. 13 illustrates a side-cut detailed view of the sealing apparatus from FIG. 11.
Figure 14:
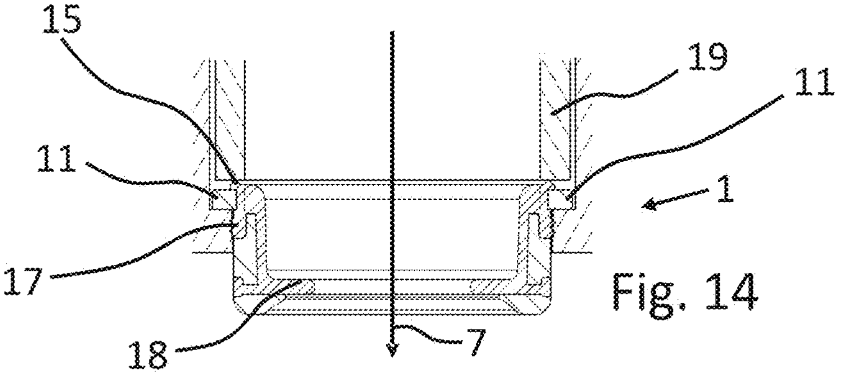
FIG. 14 illustrates a schematic side view of the sealing apparatus in a state when installed in a housing of a ball valve apparatus, with a section of a corresponding mounting tool.
Figure 15:
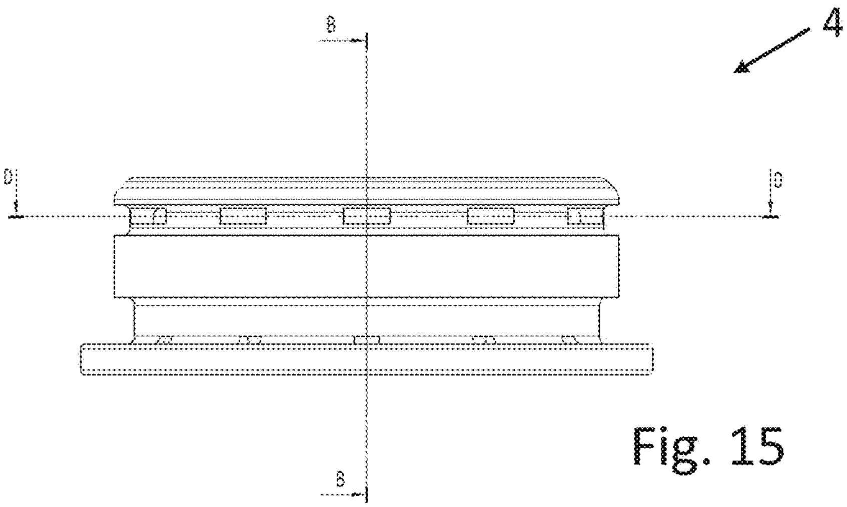
FIG. 15 illustrates a side view of the housing device of the sealing apparatus.
Figure 16:
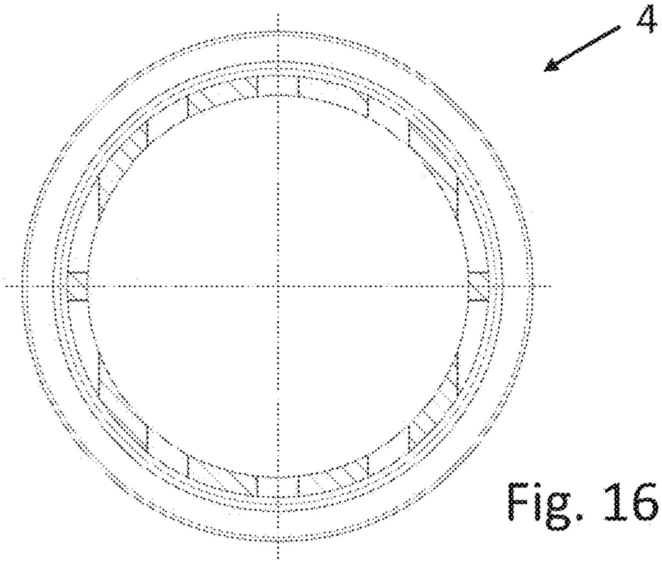
FIG. 16 illustrates a cross-sectional view of the housing device from FIG. 15, cut along the line D-D.
Figure 17:
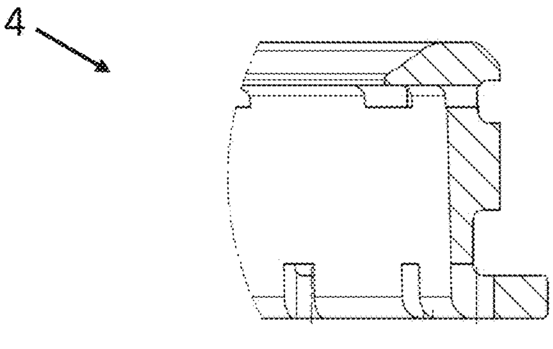
FIG. 17 illustrates a cross-sectional detailed view of the housing device from FIG. 15, cut along the line B-B.

In the following, a mounting apparatus (not shown) according to the disclosure, having a mounting tappet 19 according to the disclosure and a sealing apparatus 1 according to the disclosure according to a first and a second exemplary aspect (FIGS. 1 and 2), is described in further detail.

The mounting apparatus according to the disclosure, which is not described in further detail, can comprise a robotic arm or other mechanical mounting means, with which it is possible to arrange the mounting tappet 19 according to the disclosure which is connected thereto in a housing 22 of a ball valve apparatus 23 and to subject it to a force acting in the axial direction 6.

The mounting tappet 19 according to the disclosure is configured as a rotationally symmetrical cylindrical body and comprises a closure body stop face 26 extending orthogonally to the axial direction 6 at a free end positioned in front when viewed in the axial direction 6 for axial abutment against a closure body 24 of a ball valve apparatus.

The closure body stop face is in particular a circular disk-shaped face arranged centrally on the mounting tappet 19.

An annular sealing stop face 27 is configured to be offset in the axial direction 6 from the closure body stop face.

The sealing stop face 27 is in particular arranged at a radial edge region of the mounting tappet 19.

A section formed on a closure body 24 against which the closure body stop face abuts in an final mounting position is hereinafter referred to as the second stop face 28.

A corresponding section of a housing device 4 of the sealing apparatus 1, which is made from a hard component, at which the seal abuts against the sealing surface 27, is hereinafter referred to as the first stop face 29.

Furthermore, according to the present disclosure, there is provided a method for mounting a sealing apparatus with a mounting system for a sealing apparatus of a ball valve apparatus, as described above. This method comprises the following steps: arranging a sealing apparatus in a housing of a ball valve apparatus, arranging a mounting tappet of a mounting apparatus on a housing side of the sealing means, contacting a sealing stop face at an approximately correspondingly formed first stop face of the sealing means by exerting a force acting in the axial direction on the mounting tappet, exerting a force acting in the axial direction on the mounting tappet until a closure body stop face abuts against a surface of a closure body of the ball valve apparatus, wherein this section of the closure body is referred to as the second stop face, and wherein, at this moment, the mounting tappet is no longer subjected to force acting in the axial direction, and wherein a final mounting position of the sealing means is achieved.

In particular, it can be provided that the sealing apparatus is first placed on a receiving section of the mounting tappet before being introduced into a housing of a ball valve apparatus.

The sealing apparatus 1 according to the disclosure for a ball valve apparatus (not shown) will now be described in further detail on the basis of a third exemplary aspect (FIGS. 3 to 11).

The sealing apparatus 1 comprise a valve side 2 facing towards a closure body (not shown) of a ball valve apparatus and a housing side 3 facing towards a port (not shown) of a housing (not shown) of a ball valve apparatus.

In addition, the sealing apparatus 1 comprises a housing device 4 made from a hard component and a sealing means 5 made from a soft component. The housing device 4 is made from PPA or from PPS. The sealing means 5 is made from an elastomer.

The sealing apparatus 1 extends in an axial direction 6 and is provided for a flow from the valve side 2 towards the housing side 3 in a flow direction 7.

Furthermore, the housing device 4 is approximately tubular in form and limits a through-opening 8.

A catching device 9 is arranged at a free end of the housing side 3.

The catching device 9 comprises catching arms 10 that are radially circumferential and equally spaced apart from one another and extending in the axial direction 6, on which radially extending and semi-circularly formed catching elements 11 are molded.

In the region between the catching arms 10 and alternating with these, crenelation elements 12 extending in the axial direction 6 are integrally formed, being radially circumferential and equally spaced apart from one another.

The crenelation elements 12 are formed to be approximately T-shaped in a top plan view and have a plunge channel 13 extending in the axial direction 6. The plunge channel 13 is provided for receiving tolerance compensation sections 14 of a tolerance compensation element 15.

The housing side 3 of the sealing apparatus 1 is limited radially outward by the catching arms 10 and the crenelation elements 12.

In the region of the valve side 2, the sealing apparatus 1 is limited in a radially outward direction by the sealing means 5.

Three sealing lips 16 extending radially outwards are molded on the sealing means 5 in the axial direction 6 approximately centrally, being radially circumferential and equally spaced apart from one another. These sealing lips 16 form a radial sealing element 17 for sealingly abutting against a port of a housing of a ball valve apparatus.

In addition, the sealing means 5 forms a closure body sealing element 18 that extends radially circumferentially and in the axial direction 6 in the region of the valve side 2. The closure body sealing element 18 is configured to sealingly abut a closure body of a ball valve apparatus.

The sealing means 5 made from the soft component extends in the axial direction 6 or in the flow direction 7 through the plunge channels 13 of the crenelation elements 12 in such a way that the tolerance compensation sections 14, which extend orthogonally to the axial direction 6, are formed on the housing side 3. These tolerance compensation sections 14 form a tolerance compensation element 15, which represents a distal end region of the housing side 3 of the sealing apparatus 1.

Such a sealing apparatus 1 according to the disclosure according to the third exemplary aspect can be arranged in a housing of a ball valve apparatus by means of the mounting apparatus (not shown). The mounting apparatus comprises a mounting tappet 19, which is configured to correspond to the structural configuration of the sealing apparatus 1 and comprises a first stop section for abutting against a closure body of a ball valve apparatus. A second stop section is formed on an end of the mounting tappet opposite this stop section, against which the tolerance compensation element 15 and tolerance compensation sections 14 abut, respectively.

According to the third exemplary aspect, it is preferably provided that the sealing apparatus 1 comprises only the radial sealing element 17 for sealing against a housing of a ball valve apparatus.

According to a mounting method according to the disclosure, it is provided that the sealing apparatus 1 is first arranged on the mounting tappet 19 of the mounting apparatus. Then, the sealing apparatus is moved with the mounting tappet into a port of a ball valve apparatus towards a closure body of the ball valve apparatus until the first stop section of the mounting tappet abuts the closure body. The tolerance compensation element 15 of the sealing apparatus abuts the second stop section of the mounting tappet.

Due to the tolerance compensation element 15, a certain assembly tolerance of the closure body or a tolerance between the closure body sealing element and a closure body of the ball valve apparatus can be compensated.

A sealing apparatus 1 according to the disclosure according to a fourth exemplary aspect is described in greater detail in the following (FIGS. 11 to 16).

Unless otherwise described, the sealing apparatus 1 according to the fourth exemplary aspect has the same technical features as the sealing apparatus 1 according to the third exemplary aspect. Identical technical features bear the same reference numerals.

The sealing apparatus 1 according to the fourth exemplary aspect is preferably configured for a flow from the housing side 3 towards the valve side 2. The flow direction 7 is thus carried out in the opposite direction compared to the first exemplary aspect.

In the region of the valve side 2, the tubular housing device 4 forms the termination of the sealing apparatus 1, which is thus made from a hard component. In the region of the housing side 3, the housing device 4 comprises a radially circumferential flange section 20.

Radially circumferentially and equally spaced from one another, half-sphere catching elements 11 of the catching device 9 extending radially outwardly are molded on the flange section 20.

According to an advantageous further development, the flange section 20 can be configured as a stop element for stopping on the mounting tappet 19 of the mounting apparatus and/or on a correspondingly configured section of a housing of a ball valve apparatus.

Adjacent to the flange section 20, the radial sealing element 17 of the sealing means 5 is arranged. According to this exemplary aspect, the radial sealing element 17 comprises two radially circumferential sealing lips 16 extending in the axial direction adjacent to one another and extending in the radially outward direction, analogously to the first exemplary aspect.

On the housing side 3, an axial sealing element 21, which extends in the axial direction 6 or counter to the flow direction 7, can be molded. The axial sealing element 21 can be configured for sealing abutment against a section of a housing of a ball valve apparatus, according to one aspect.

According to an alternative aspect, the axial sealing element can form a radially circumferential tolerance compensation element 15 which is continuously formed and extends in the axial direction 6.

According to a further aspect, this tolerance compensation element 15 or axial sealing element 21 can perform and/or take over the tasks of the tolerance compensation element 15 as well as the axial sealing element 21.

In the region of the valve side 2, the closure body sealing element 18 is rearwardly offset in the axial direction in relation to the hard component of the housing device 4.

According to this exemplary aspect, the closure body sealing element 18 extends in a radial direction inwardly orthogonally to the axial direction 6 or flow direction 7.

The mounting apparatus 19 comprises a mounting tappet, which is configured to correspond to the structural design of the sealing apparatus 1 according to the second exemplary aspect.

The sealing apparatus 1 preferably comprises the tolerance compensation element 15.

The technical features of the sealing apparatus 1 according to the disclosure according to the first and the second exemplary aspects can be combined as desired with one another, insofar as technically possible and sensible.

In addition, it can also be provided that the flow goes through the sealing apparatus 1 according to both exemplary aspects counter to the preferred flow direction 7.

A corresponding method for mounting is carried out analogously to the mounting method described on the basis of the first exemplary aspect.

Furthermore, according to the present disclosure, a method for manufacturing the aforementioned sealing apparatus is provided, in which the sealing apparatus 1 is produced by means of a 2-component injection-molding process.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

LIST OF REFERENCE NUMERALS

1 Sealing apparatus
2 Valve side
3 Housing side
4 Housing device
5 Sealing means
6 Axial direction
7 Flow direction
8 Through-opening
9 Catching device
10 Catching arm
11 Catching element
12 Crenelation element
13 Dipping channel
14 Tolerance compensation section
15 Tolerance compensation element
16 Sealing lip
17 Radial sealing element
18 Closure body sealing element
19 Mounting tappet
20 Flange section
21 Axial sealing element
22 Housing
23 Ball valve apparatus
24 Closure body
26 Closure body stop face
27 Sealing stop face
28 Second stop face
29 First stop face

What is claimed is:

1. A mounting system for a sealing apparatus of a ball valve apparatus, comprising:

a sealing apparatus, wherein the sealing apparatus comprises a housing device made of a first component and a sealing means made of a second component softer than the first component;

a mounting apparatus having a mounting tappet extending in an axial direction, wherein the mounting tappet comprises a closure body stop face for abutting against a closure body of the ball valve apparatus and a sealing stop face for abutting against the sealing apparatus, such that the sealing apparatus can be arranged at a predefined distance from the closure body.

2. The mounting system according to claim 1, wherein the sealing stop face extends orthogonally to the axial direction and is formed as a tangentially circumferential circular-annular surface arranged on an edge region of the mounting tappet.

3. The mounting system according to claim 1, wherein the closure body stop face extends orthogonally to the axial direction and is configured as a circular disc-shaped surface arranged centrally on the mounting tappet.

4. The mounting system according to claim 1, wherein the closure body stop face forms a free end of the mounting tappet in the axial direction, and wherein the sealing stop face is offset from the closure body stop face in the axial direction.

5. The mounting system according to claim 1, wherein the mounting tappet comprises a receiving section for receiving the sealing apparatus.

6. The mounting system according to claim 1, wherein the sealing means further comprises:

a closure body sealing element arranged on a valve side of the sealing means for sealingly abutting against the closure body of the ball valve apparatus; and an axial or radial sealing element extending in the radial or axial direction for sealing against a housing of the ball valve apparatus.

7. A method for mounting a sealing apparatus with a mounting system for the sealing apparatus of the ball valve apparatus according to claim 1, comprising the following steps:

arranging the sealing apparatus in a housing of the ball valve apparatus;

arranging the mounting tappet of the mounting apparatus on a housing side of the sealing means;

contacting the sealing stop face at an approximately correspondingly formed first stop face of the sealing means by exerting a force acting in the axial direction on the mounting tappet; and exerting a force acting in the axial direction on the mounting tappet until the closure body stop face abuts against a surface of the closure body of the ball valve apparatus, wherein this section of the closure body is referred to as the second stop face, and wherein, at this moment, the mounting tappet is no longer subjected to force acting in the axial direction, and wherein a final mounting position of the sealing means is achieved.

8. The method according to claim 7, further comprising, prior to arranging the sealing apparatus in the housing of the ball valve apparatus, arranging the sealing apparatus on a receiving section of the mounting tappet.

9. A method for manufacturing the sealing apparatus according to claim 7, wherein the sealing apparatus is manufactured by means of a 2-component injection-molding process.

* * * * *